United States Patent
Swei et al.

(10) Patent No.: US 6,413,286 B1
(45) Date of Patent: Jul. 2, 2002

(54) PRODUCTION TOOL PROCESS

(75) Inventors: Gwo Shin Swei, East Amherst; Damien C. Nevoret, Amherst, both of NY (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 09/564,092

(22) Filed: May 3, 2000

(51) Int. Cl.[7] ............... B24D 11/00; B24D 18/00
(52) U.S. Cl. ............... 51/298; 51/295; 51/293; 51/307
(58) Field of Search ............ 51/298, 293, 307, 51/308, 309, 295

(56) References Cited

U.S. PATENT DOCUMENTS

| | | | |
|---|---|---|---|
| 4,393,450 A | * 7/1983 | Jerard | ............... 364/474 |
| 4,478,769 A | 10/1984 | Pricone et al. | |
| 5,014,468 A | 5/1991 | Ravipati et al. | |
| 5,152,917 A | 10/1992 | Pieper et al. | |
| 5,300,263 A | 4/1994 | Hoopman et al. | |
| 5,304,223 A | * 4/1994 | Pieper et al. | ............... 51/293 |
| 5,345,052 A | * 9/1994 | Puddephatt | ............... 219/69.17 |
| 5,435,816 A | 7/1995 | Spurgeon et al. | |
| 5,454,844 A | 10/1995 | Hibberd et al. | |
| 5,489,235 A | 2/1996 | Gagliardi et al. | |
| 5,641,448 A | * 6/1997 | Yeung et al. | ............... 264/401 |
| 5,833,724 A | 11/1998 | Wei et al. | |
| 5,840,088 A | 11/1998 | Yang et al. | |
| 5,863,306 A | 1/1999 | Wei et al. | |
| 5,928,394 A | * 7/1999 | Stoetzel | ............... 51/295 |
| 5,937,265 A | * 8/1999 | Pratt et al. | ............... 419/66 |
| 5,946,991 A | 9/1999 | Hoopman et al. | |

OTHER PUBLICATIONS

"The Arrival of RP and its Value to US Manufacturing" Wohlers Oct. 1995.
"Rapid Prototyping: An Update on RP Applications, Technology Improvements and Developments in the Industry" Wohlers (1991). (No Month).

* cited by examiner

*Primary Examiner*—Michael Marcheschi
(74) *Attorney, Agent, or Firm*—David Bennett

(57) ABSTRACT

The production of an engineered surface on a coated abrasive is made more versatile by the use of a production tool obtained using a master tool created by a rapid prototyping technique.

8 Claims, 3 Drawing Sheets

PRODUCTION TOOL PROCESS

BACKGROUND OF THE INVENTION

This invention relates to processes for the production of tools for manufacturing operations. The tools of interest in this particular application are those which are used to mold, emboss or print a surface with a desired pattern. The tools, which are referred to hereinafter as "pattern-forming tools", can have the form of a roll in which the surface has the desired pattern, or a simple plate or a belt with the pattern formed on the surface.

The main interest for the present invention is in the creation of tools that can be used to produce coated abrasives with surfaces engineered to produce specifically designed effects. The invention will be described with this subject matter as the principal focus but it should clearly be understood that the invention can readily be adapted to meet the needs of a wide variety of printing, shaping or embossing applications that have no direct connection to coated abrasives but which share a common need for a rapid, versatile and economic technique for the production of tools with complex patterns formed on the surface of the tool.

Coated abrasives with engineered surfaces are formed by depositing a layer comprising abrasive particles dispersed in a curable binder formulation. The binder is frequently but not essentially a radiation-curable binder and the abrasive particles can be any of those commonly used in coated abrasives including fused and sintered alumina, silicon carbide, alumina/zirconia, superabrasives such as cubic boron nitride, complex aluminum/magnesium borides and diamond, and softer abrasives intended for polishing softer materials such as glass including silica, alpha alumina precursors and ceria. The surfaces may be engineered by a molding or embossing or rotogravure deposition technique such are described for example in U.S. Pat. Nos. 5,014,468; 5,152,917; 5,840,088; and 5,863,306.

Often it is advantageous to provide that the surface comprises repeating shapes that may be exactly identical and regularly spaced but for many other applications it is desirable that the shapes be arranged in patterns that include shapes that are not the same and/or are not in a uniform pattern across the whole surface shaping tool. Such departures from the regular are found to be effective in avoiding the development of scratch patterns or scribing on the surface of the substrate being abraded. However the need for non-uniformity makes the production of the surface shaping tool, (which is commonly produced by knurling appropriate patterns on the surface of the tool), much more difficult and technically challenging where the knurling of a pattern of continuous straight lines across the tool surface will not produce the desired non-uniform pattern.

In addition the tool surface often represents a compromise since the expense of producing specifically designed tools for each application is considerable. A further complicating factor is that, because of the contact with abrasive materials, the life of a tool before it becomes eroded or otherwise deformed can be quite limited.

There exists therefore a need for a process for making surface-forming or shaping tools that is extremely versatile, speedy and economic. The present invention provides such a process and forming tools made by this process. The tool can be adapted for a range of processes including molding, embossing, rotogravure deposition and/or printing. As indicated above however, the main interest explored in the description of the invention that is provided herein is the production a tool suitable for making patterned, (or "engineered"), coated abrasive products.

DESCRIPTION OF THE INVENTION

The present invention provides a process for the production of a coated abrasive having an engineered patterned surface characterized in that the pattern on the surface is generated using a tool produced by a rapid prototyping technique.

Coated abrasives having engineered patterned surfaces are generally coated abrasives having a substrate material and an abrasive layer deposited on the backing comprising abrasive particles dispersed within a cured binder. The abrasive layer has a surface engineered to have a pattern which generally provides a plurality of locations in which the thickness of the layer is greater than the average thickness of the layer. The pattern comprises regularly repeating units though within each unit the pattern may be somewhat randomized. Typical examples of coated abrasives with engineered patterned surfaces are described for example in U.S. Pat. Nos. 5,152,917; 5,454,844; 5,489,235; 5,658,184; 5,672,097; 5,681,217; 5,833,724; 5,840,088 and 5,863,306.

The techniques described for producing the patterned surfaces include rotogravure printing, embossing and molding. The tools therefore can be used for example as molds, embossing rolls or gravure rolls.

Other techniques involve the scribing of parallel triangular grooves in a tool then scribing more parallel grooves at right angles to the first leaving square-based pyramids on the surface. This surface can be used directly as the shaping tool or it can be used to mold the female equivalent variation. This technique is described in U.S. Pat. No. 5,300,263. Other processes inscribing or knurling a pattern on a roll include U.S. Pat. Nos. 4,478,769; 5,435,8116; 5,489,235; and 5,946,991. All such processes require the production of cutting tools and the tools must be continually and carefully aligned and the types of pattern that can be reproduced are strictly limited and aligned with each other between parallel lines.

The present invention permits unlimited versatility in the choice of pattern and is limited only to the extent the size of the surface that can be produced by a specific RPM machine is limited. Whatever the technique, the present invention requires the use of a tool that can be readily fabricated by a rapid-prototyping, ("RP"), technique and that can be used and discarded or replicated without considerable expense.

DRAWINGS

Figure 1C:
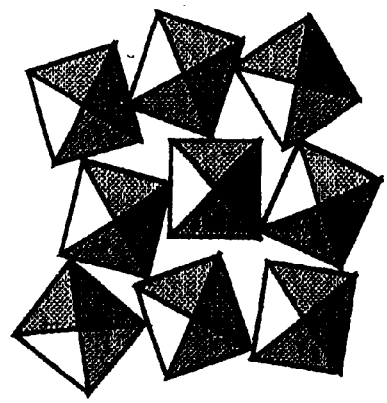
FIG. 1 is a top view drawing of three different types of surface, 1(a), 1(b) and 1(c) that can be produced by RP techniques but not by conventional scribing techniques.
Figure 1B:
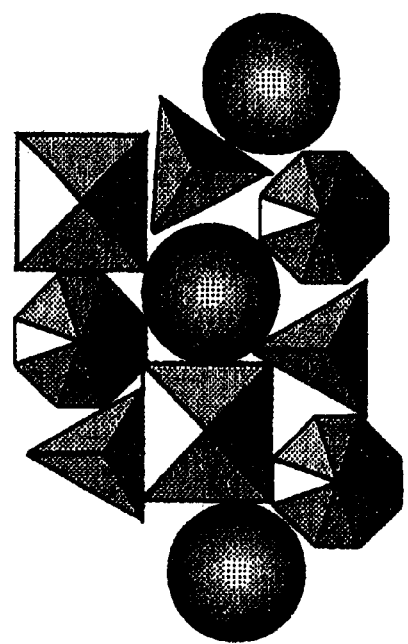
Figure 1A:
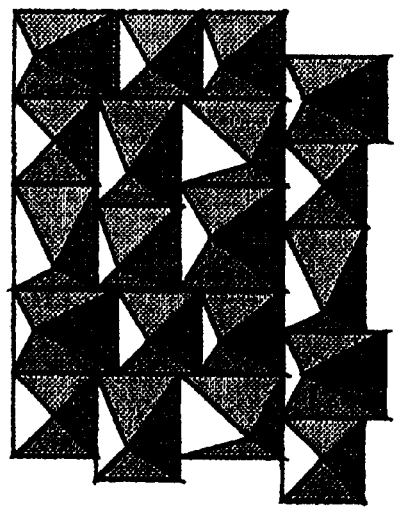
Figure 2:
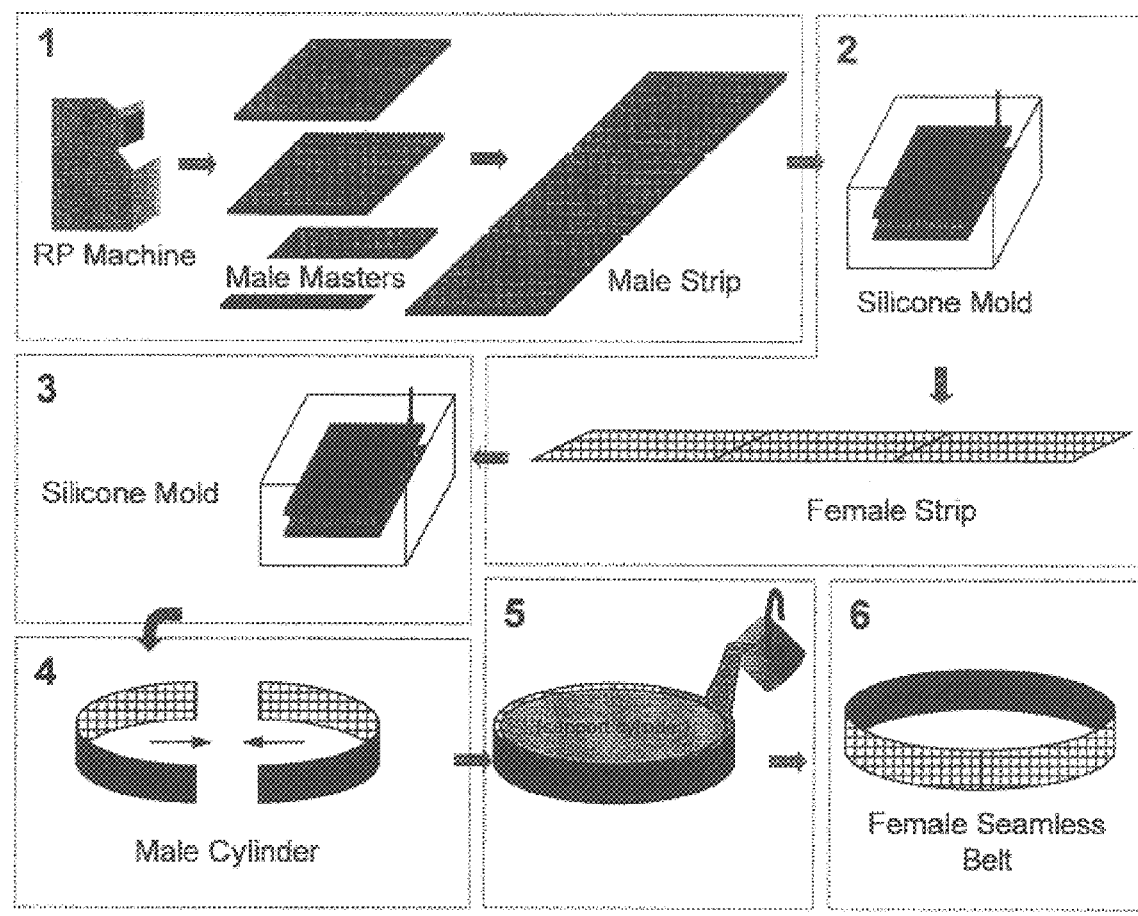
FIG. 2 shows a flow diagram of the making of a production tool using one procedure within the terms of the present invention.
Figure 3:
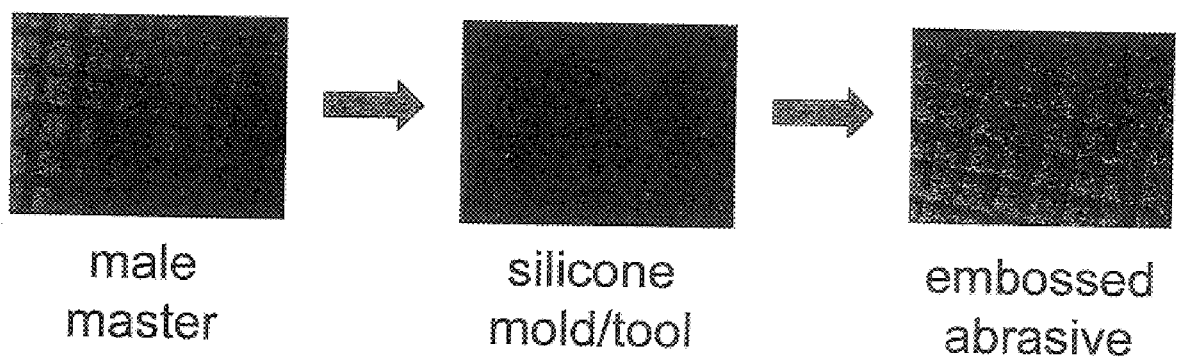

FIG. 3 shows the top view of three stages in the production of a coated abrasive. From left to right they are the "male master" made by an RP technique; a silicone molded version, (female), made from the male master; and an abrasive with an engineered surface made by embossing a layer of a slurry comprising a curable binder having abrasive particles dispersed therein using a production tool made from the silicone molded form.

DESCRIPTION OF PREFERRED EMBODIMENTS

The technique of rapid prototyping has a number of useful embodiments which will be discussed below but it is understood that there may be a number of techniques that go beyond those described below which are adaptable to the basic invention but which have the same basic characteristics, namely:

1) computer design of a desired surface pattern;
2) reduction of the design to a computer program that can be reduced to a number of horizontal slices that when laid on top of one another produce the desired design;
3) realization of the design in the form of a prototype surface-shaping tool; and
4) the use of the prototype to generate a production tool. The various techniques within this production process are now further discussed in detail.

Rapid Prototyping

The term "rapid prototyping" is used to describe a variety of techniques by which to generate a prototype of the male master shaped surface in a rapid and entirely reproducible fashion. All the techniques operate by converting a computer file into an actual object. The computer file is generated by a computer-assisted design program, (usually called a "CAD program"), which provides the capability of designing a shape and then viewing that shape in three dimensions from a variety of angles. For a variety of reasons the program generates the design in the form of an "STL file" format. "STL" is the abbreviation for "stereolithography" which is one technique by which the file can be used to generate the male master. Such STL files can however be used to convert the file into a male master by a variety of alternative techniques as will discussed further below.

There are a number of available suppliers of CAD design packages including "Solidedge" available from Unigraphics; "SolidView" from Solid Concepts; Solidworks and Autocad 2000. The design may be saved in formats other than STL files including for example DWG/DXF, IDEAS, IGES, and VRML files.

The rapid prototyping machine usually, (but not always as will be seen), works on the same principle: the file generated by the CAD machine, (such as an STL file), is manipulated to produce a sequence of horizontal sections through the design such that the overall shape is converted to a plurality of horizontal slices. The program is then used to produce physical embodiments of each slice by a convenient technique, (some of which are discussed below), in sequence such that the desired pattern is built in three-dimensions by sequential deposition of slices on top of previous deposited slices.

The technique of rapid-prototyping has a number of embodiments though all share a common procedure in which a desired surface is created in a computer using a "computer aided design" program. This program generates a computer image of the projected design that is viewable from all angles at will. This design is then used to generate a production tool that is used to create the engineered patterned surface on the coated abrasive.

There are several ways in which the production tool can be generated but in most cases, the RP technique produces a pattern with a relatively small surface area, usually no larger than one square foot. Thus the pattern needs to replicated and the individual patterns joined together to form a suitable-sized commercial tool. This of course gives further opportunities for variation in the pattern created on the coated abrasive surface by the use of a variety of individual patterns. It is therefore understood that the production tool can and often does comprise a plurality of similar or different RP-generated units.

The RP technique can be used to produce a pattern that is male or female in structure. Depending on the design it may be desired to produce a secondary shaping tool that is the inverse of the pattern made by the RP technique: that is to say if the RP technique makes a male pattern, it may be desirable to use it to generate a female pattern, and of course vice versa. The benefit of this approach is that the RP-generated pattern can not only be archived and used repeatedly to generate multiple inverse replicas, but it can also be rapidly and inexpensively replaced by generating it again with an RP machine.

The RP technique has a plurality of embodiments in which the production tool can be made directly using a computer-controlled deposition program. A typical process of this type is "Laser Engineered Net Shaping" in which a stream of molten metal droplets carried in a gas stream are laid down in a three-dimensional pattern determined by sequential deposition of the "slices" of structure generated by the program.

More frequently however the RP technique is used to produce an intermediate which is itself used to form the production tool.

One convenient technique for obtaining an intermediate by an RP technique involves immersing a platform bearing a substrate material in a bath of radiation-curable resin with the platform just below the surface. The RP machine then passes a laser beam on to the surface of the resin bath in a pattern determined by the first slice generated by the RP machine. The laser causes the curing and solidification of the resin in the area contacted, thus replicating in resin form the first slice. The platform is then lowered just below the surface of the bath and the laser is again activated to produce a cured resin shape corresponding to the second slice. This process is repeated until all the slices have been replicated and a solid resin structure, comprising the layers deposited in sequence and fused together, has been generated which corresponds exactly to the shape designed by the CAD machine. This then provides the male master. Suitable equipment can be obtained, for example, from 3-D Systems; Aaroflex; Fockele & Schwartze (in Germany); and CMET/Mitsubishi, Mitsui, Teijin, and Seiki Denken (in Japan).

An alternative technique comprises a modified inkjet deposition technique in which a thermoplastic polymer is melted and deposited from an inkjet head on to a substrate which is supported on a platform. The drops are laid down in a pattern dictated by the RP program which again has converted the original CAD output into a series of slices. The drops solidify when they contact the surface on which they are deposited and after the production of the first slice is completed the platform descends by an incremental amount and a second slice is formed on top of the first. Subsequent slices are laid one on top of the previous slice until the CAD shape is replicated in the thermoplastic polymer. Suitable equipment is supplied by 3-D Systems, Sanders Prototype and Optometric.

A similar technique deposits metal powder along with a molten polymer. The layers deposited are built up into the desired structure and the polymer used to bond the particles is then burned out as the particles are sintered together to form the final shape. Suitable equipment can be obtained, for example, from Z-Corp (which uses a starch-cellulose system that is not fired), Soligen, Extrude Hone and Therics. The shape may be further refined by milling to give added precision to the shape if desired.

If an overhang shape is required, this can be accommodated by building a temporary support on the platform and later dissolving the support after the desired overhang shape has been produced. (This applies mainly to the polymer inkjet deposition machines. Most other machines must build supports with the normal build material; these supports must be manually removed upon build completion.)

A similar technique in which the polymer is replaced by molten metal droplets suspended in a gas stream, has been developed. It operates however in much the same way and is sometimes called "laser-engineered net shaping", or "LENS".

In a further option the RP machine can generate a series of slices cut from a suitable material, such as a plastic or metal sheet, which are designed to be laid one on top of another in a specified order until the desired shape has been produced. This will be understood to be a variant on the continuous process described above. Manufacturers of equipment that can be adapted for use of this technique in the service of the present invention include Helisys Corp., Schroff Development Corp. and Kira KK in Japan and Kinergy in Singapore.

Yet another technique is the use of lasers to cause selective fusion or sintering. As before a layer of powder is placed on a substrate material and a laser beam is projected at the layer in a pattern determined by the RP device. The powder, which may be of plastic, metal, wax or coated ceramic, is thereby fused into a continuous layer in the areas contacted by the laser. The substrate is then lowered, a new powder layer is deposited and a laser-fused layer is laid on top of the first and so on until the desired structure, comprised of many superimposed layers, has been completed. Equipment that can be used in this type of process is available from DTM Corporation and EOS GmbH, (in Germany)

All of these above techniques can be used to produce a "master" that is "male" or "female".

Formation of Female Pattern

A male master can then be used to produce a female pattern, (and equally vice versa), preferably by a simple "kiss-molding" process in which a moldable material is placed in contact with the male master, conformed to the surface of the master, cured in that position, and then removed from the male master to provide an exact female replication of the surface contours of the male master. The material from which the female pattern is produced can be any suitable thermoplastic or thermoset resin but for many reasons such a cost, formability, release properties, inertness and so on, an addition-cured silicone polymer is preferred. The same male master can be used to replicate a large number of female patterns because little damage is done to the male master during each molding operation. Thus a potentially unlimited number of female patterns can be made from the same male master and a library of such male masters can be maintained to give the production line maximum flexibility. Additionally male masters identical to the original can be made relatively quickly and inexpensively with an RP machine.

Production Tool

Where a male production tool is required, the female pattern is then used to make a production tool by affixing the pattern to the surface of a substrate with the appropriate dimensions and configuration. For example the female pattern can be adhered to the surface of an embossing roll such that the female pattern surface is the embossing agency when the roll is used. Of course a roll is not essentially used in this portion of the process and a flat platen mold can be substituted.

Usually the surface of the production tool is significantly larger than the female pattern sheet that is produced from the male master. In such event the production tool can be made by replication of the master, assembly of a plurality of the replicated masters, (which may be replicated from the same or different masters), to form a large master of the desired size and then using the large master to form a production tool. The production of the production tool is most conveniently done by a conventional kiss molding technique using a resin material from which to form the production tool. Alternatively a number of male masters can be produced by an RP technique and assembled so as to form a large master from which a female sheet can be produced with a surface area large enough to cover the entire production tool surface.

In some circumstances a large male production tool is needed and this can be accommodated within the present invention by adhering several pattern sheets to form a cylindrical form with the pattern side inwards. A support cylinder is then accommodated within the cylinder created from the combined female pattern sheets with the space between the support cylinder and the inside surface of the cylinder formed from the female pattern sheets providing a mold. A molding composition, such as a curable silicone resin, is then introduced into the mold and cured therein to form a cylindrical male pattern. By selection of the dimensions of the cylinder formed from the female pattern sheets it is possible thereby to produce a seamless sleeve that can be fitted over a roller to produce a production tool in the form of an embossing roll.

The production tool can be adapted for use in other forming processes such as the creation of a specific surface configuration in an engineered surface by curing a formulation comprising a radiation-curable binder while the formulation is actually in contact with the production tool. This can be done by forming the production tool from a radiation-transparent material such that cure can occur by radiation passing through the material of the production tool. Alternatively if the backing upon which the engineered surface is to be formed is a transparent film, the cure can be through the backing material. Similarly it could be used to form a thermoplastic surface by heating the thermoplastic and embossing the heat-softened material.

The production tool is then used to create the engineered surface of a coated abrasive. The surface on which this surface is created is comprised of a curable resin with, dispersed therein, abrasive particles and optionally other additives such as lubricants, fillers, grinding aids, adhesion control additives, curing promoters and the like and mixtures of two or more of such materials. The curable resin can be curable by heat or moisture or by chemical reaction but preferably the resin is radiation-curable by which is meant that it can be caused to harden by exposure to UV, visible light or electron beam radiation optionally with the assistance of curing initiators or promoters ("aids").

The production tool can be a mold wherein the curable binder is cured at least partially while in contact with the tool. Alternatively it can be an embossing roll or platen which is removed before cure of the binder is initiated. All such tools can be made according to the RP process and then used to create an engineered surface by the process of the invention having a degree of complexity unrivalled by prior art techniques.

We claim:

1. A process for producing a coated abrasive with an engineered surface which comprises;
   a) using a rapid prototyping technique to produce a master tool;
   b) using the master tool as a mold from which to make a plurality of production tool sections;
   c) assembling said sections to produce a cylindrical production tool having a patterned surface;
   d) depositing a layer of a curable binder resin having abrasive particles dispersed therein on a substrate;
   e) using the production tool to impose a pattern on the layer; and f) curing the curable binder resin to produce a coated abrasive having an engineered surface.

2. A process according to claim 1 in which the production tool is in a form selected from the group consisting of an embossing plate, roll, belt or web.

3. A process according to claim 1 in which the binder resin is cured while in contact with the production tool.

4. A process according to claim 1 in which the rapid prototyping technique uses stereolithography.

5. A process according to claim 4 in which the stereolithography process employs an ink-jet deposition technique.

6. A process according to claim 1 in which the rapid prototyping produces a male master.

7. A process according to claim 1 in which the curable resin binder is a radiation-curable resin.

8. A process according to claim 1 in which, besides abrasive grain dispersed within the curable binder, the binder contains other adjuvants selected from the group consisting of grinding aids, lubricants, curing aids, fillers, adhesion control additives and mixtures thereof.

* * * * *